US011257247B2

(12) United States Patent
Love

(10) Patent No.: US 11,257,247 B2
(45) Date of Patent: Feb. 22, 2022

(54) CAMERA-BASED DOOR POSITION SYSTEM

(71) Applicant: Schlage Lock Company LLC, Carmel, IN (US)

(72) Inventor: Devin A. Love, Westfield, IN (US)

(73) Assignee: Schlage Lock Company LLC, Carmel, IN (US)

( * ) Notice: Subject to any disclaimer, the term of this patent is extended or adjusted under 35 U.S.C. 154(b) by 210 days.

(21) Appl. No.: 16/367,842

(22) Filed: Mar. 28, 2019

(65) Prior Publication Data
US 2020/0311972 A1  Oct. 1, 2020

(51) Int. Cl.
*G06T 7/73* (2017.01)
*G06T 7/13* (2017.01)
*E05B 47/00* (2006.01)
*G08B 13/08* (2006.01)
*G08B 13/196* (2006.01)

(52) U.S. Cl.
CPC ............. *G06T 7/74* (2017.01); *G06T 7/13* (2017.01); *E05B 2047/0068* (2013.01); *G06T 7/73* (2017.01); *G08B 13/08* (2013.01); *G08B 13/19604* (2013.01)

(58) Field of Classification Search
CPC ..... G06T 7/74; G06T 7/13; G06T 7/73; E05B 2047/0068; G08B 13/196
See application file for complete search history.

(56) References Cited

U.S. PATENT DOCUMENTS

| | | | |
|---|---|---|---|
| 6,339,375 B1 * | 1/2002 | Hirata | G01V 8/10 187/317 |
| 6,756,910 B2 | 6/2004 | Ohba et al. | |
| 7,457,437 B2 | 11/2008 | Ertl et al. | |
| 8,660,700 B2 | 2/2014 | Jia et al. | |
| 9,064,394 B1 * | 6/2015 | Trundle | H04N 7/188 |
| 9,208,629 B2 | 12/2015 | Saladin et al. | |
| 9,576,469 B2 | 2/2017 | Modi et al. | |
| 9,822,553 B1 * | 11/2017 | Ho | E05B 37/0044 |
| 2002/0183008 A1 | 12/2002 | Menard et al. | |
| 2008/0298693 A1 * | 12/2008 | Hampapur | G08B 13/1968 382/236 |

(Continued)

FOREIGN PATENT DOCUMENTS

CN    108890657 A  * 11/2018

OTHER PUBLICATIONS

Nest Cams Now Know What a Door Looks Like and Can Monitor Them Automatically, TechCrunch, Feb. 14, 2017, 2 pages, https://techcrunch.com/2017/02/14/nest-cams-now-know-what-a-door-looks-like-and-can-monitor-them-automatically/ (retrieved on Jan. 15, 2020).

*Primary Examiner* — Jaime M Holliday
(74) *Attorney, Agent, or Firm* — Taft Stettinius & Hollister LLP

(57) ABSTRACT

A method of determining a door state in a camera-based door position system according to one embodiment includes capturing, by a camera system, an image of a door lock secured to a door, wherein the door lock includes a thumb-turn that is moveable between a first position corresponding to a locked state and a second position corresponding to an unlocked state, converting, by a processing system, the captured image to a grayscale image, generating, by the processing system, a door state image based on the grayscale image, and determining, by the processing system, a current door state of the door based on the door state image and a reference image.

12 Claims, 8 Drawing Sheets

(56) References Cited

U.S. PATENT DOCUMENTS

| | | | |
|---|---|---|---|
| 2012/0280783 A1* | 11/2012 | Gerhardt | H04W 12/08 |
| | | | 340/5.6 |
| 2013/0038694 A1 | 2/2013 | Nichani et al. | |
| 2014/0266669 A1 | 9/2014 | Fadell et al. | |
| 2018/0367962 A1* | 12/2018 | Gilmartin | G06K 9/00335 |
| 2019/0323264 A1* | 10/2019 | Lunday | E05B 1/0084 |
| 2020/0312073 A1* | 10/2020 | Ivarson | G07C 9/20 |

\* cited by examiner

CAMERA-BASED DOOR POSITION SYSTEM

BACKGROUND

Understanding the security states of various doors is critical in many access control systems. Some access control systems may leverage electronic locks with sensors to determine whether a deadbolt of the lock is extended or retracted, which is used to infer the security state of the associated door. However, the electronic lock may falsely determine the door to be in a secure state if the sensors indicate that the deadbolt is extended, for example, while the door is not in a closed position (e.g., the door is propped). As such, the use of the deadbolt status as an indicia of the door security state has limitations. In order to address those deficiencies, some access control systems leverage door position systems to also determine whether the door is in an open or closed state. For example, in some implementations, traditional magnetic sensors are installed into the door frame, requiring additional custom installation procedures. Alternatively, some electronic locks may include integrated door position sensors; however, such systems often nonetheless require magnetic material to be added to the strike plate or surrounding area, and the systems are typically very susceptible to the movement of metal in and around the door lock.

SUMMARY

One embodiment is a unique system, components, and methods for camera-based door position detection. Other embodiments include apparatuses, systems, devices, hardware, methods, and combinations thereof for camera-based door position detection. This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
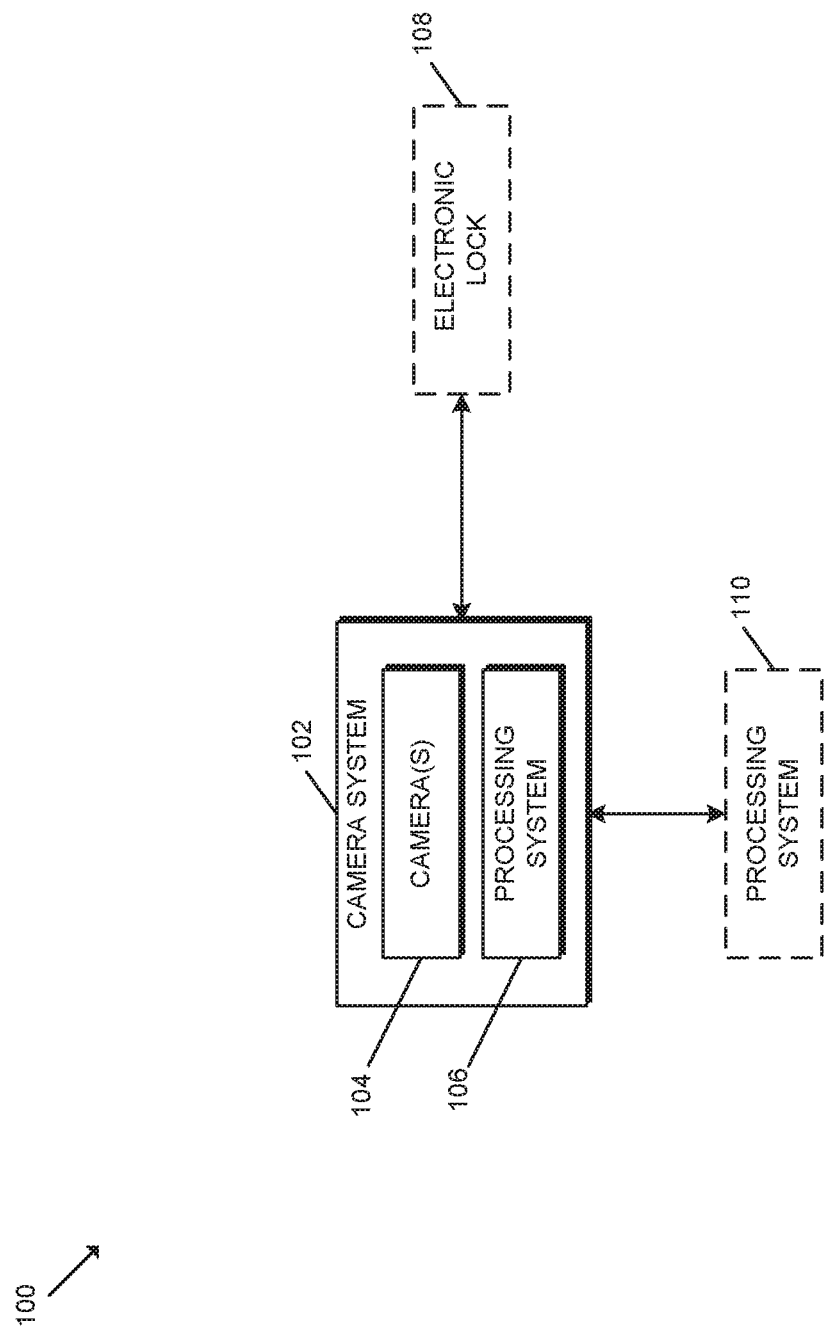
FIG. 1 is a simplified block diagram of at least one embodiment of a system for camera-based door position detection.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

The terms longitudinal, lateral, and transverse may be used to denote motion or spacing along three mutually perpendicular axes, wherein each of the axes defines two opposite directions. The directions defined by each axis may also be referred to as positive and negative directions. Additionally, the descriptions that follow may refer to the directions defined by the axes with specific reference to the orientations illustrated in the figures. For example, the directions may be referred to as distal/proximal, left/right, and/or up/down. It should be appreciated that such terms may be used simply for ease and convenience of description and, therefore, used without limiting the orientation of the system with respect to the environment unless stated expressly to the contrary. For example, descriptions that reference a longitudinal direction may be equally applicable to a vertical direction, a horizontal direction, or an off-axis orientation with respect to the environment. Furthermore, motion or spacing along a direction defined by one of the axes need not preclude motion or spacing along a direction defined by another of the axes. For example, elements described as being "laterally offset" from one another may also be offset in the longitudinal and/or transverse directions, or may be aligned in the longitudinal and/or transverse directions. The terms are therefore not to be construed as further limiting the scope of the subject matter described herein.

Referring now to FIG. 1, in the illustrative embodiment, a system 100 for camera-based door position detection is shown. The illustrative system 100 includes a camera system 102, which includes one or more cameras 104 and a processing system 106. Additionally, in some embodiments, the system 100 may include an electronic lock 108 and/or a processing system 110 separate from the camera system 102.

As described in detail below, the system 100 uses the camera system 102 to capture images (e.g., high quality images) that are analyzed using one or more computer vision algorithms or techniques in order to discern information about the security state of a door in the vicinity of the camera system 102. It should be appreciated that the techniques described herein may be employed to determine the security state of doors that do not have electronic locks with associated sensors (e.g., "smart" locks). That is, in some embodiments, the system 100 may determine the security state of doors with simple, "dumb," locks without the need for other sensors (e.g., door position sensors, deadbolt sensors, latch bolt sensors, etc.) monitoring the door. Accordingly, the system 100 may reduce the number of smart home devices required to detect the security state of doors relative to traditional techniques. Further, although the techniques are describe herein in reference to a single door, it should be appreciated that a single camera system 102 may analyze the security state of multiple doors within the field of view of the cameras 104.

As shown in FIG. 1, the illustrative camera system 102 includes one or more cameras 104 and a processing system 106. Each of the cameras 104 may be embodied as any type of device capable of capturing one or more images discretely or in a stream. For example, the cameras 104 may include one or more two-dimensional (2D) cameras, three-dimensional (3D) cameras, and/or video cameras. Although the cameras 104 are described herein generally as including image sensors that captured the visual light spectrum, it should be appreciated that one or more of the cameras 104 may be configured to capture waves/signals in the non-visual light spectrum in other embodiments. It should be further appreciated that the cameras 104 may be positioned in any suitable location(s) depending on the particular passageway, barrier(s) securing the passageway, access control device(s), and/or other characteristics of the environment. For example, in some embodiments, the cameras 104 may be secured to, embedded within, and/or otherwise attached to a nearby wall/surface and/or other structure such that the cameras are positioned to capture images of one or more barriers (e.g., doors) that secure a passageway. In some embodiments, the cameras may be configured to stream video of the environment to another device (e.g., the processing system 106 of the camera system 102 and/or a separate processing system 110). It should be appreciated that the resolution and quality of the images captured may vary depending on the particular embodiment. Although the cameras 104 are primarily described herein in the plural, it should be appreciated that the camera system 102 may include only a single camera 104 in other embodiments and the techniques described herein apply equally well to such an embodiment.

It should be appreciated that the processing system 106 of the camera system 102 is configured to process the images captured by the cameras 104 as described herein. For example, in some embodiments, the processing system 106 may be configured to convert captured images into different image formats (e.g., from color images to grayscale images, black/white images, and/or color images of a different format). Further, in some embodiments, the processing system 106 may not convert the captured images into a different image format, but instead process, for example, color images and/or one or more channels of color images.

Further, the processing system 106 may apply various computer vision algorithms, filters, and/or techniques to generate processed versions of the captured images and/or reformatted versions thereof. For example, in some embodiments, the processing system 106 may utilize image filters (e.g., kernel-based convolution, masking, etc.), edge detection algorithms (e.g., Canny edge detection, Sobel filters, etc.), image segmentation algorithms (e.g., pyramid segmentation, watershed segmentation, etc.), blob detection algorithms, corner detection algorithms, features identification and/or matching algorithms (e.g., scale-invariant feature transform (SIFT), speeded-up robust features (SURF), etc.), morphological image processing algorithms (e.g., erosion, dilation, opening, closing, etc.), and/or other suitable algorithms useful in determining the security state of a door and/or one or more components thereof. Further, in some embodiments, the processing system 106 may compare various images to one another (e.g., via thresholding or "voting" algorithms) as described herein. For example, the processing system 106 may compare real-time captured images (or processed versions thereof) to reference images of the door or component(s) thereof (or processed versions thereof) in a particular reference state (e.g., closed and locked). In some embodiments, the processing system 106 may further leverage machine learning techniques to perform the functions described herein (e.g., to better identify the security state of the door and/or components thereof). For example, in some embodiments, the processing system 106 may utilize neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, and/or other suitable machine learning algorithms, techniques, and/or mechanisms.

Although the processing system 106 is depicted as forming a portion of the camera system 102 that is separate from the camera(s) 104, it should be appreciated that the processing system 106 or a portion thereof may form a portion of one or more of the cameras 104 in some embodiments. Further, in other embodiments, the processing system 106 may be omitted from the camera system 102 (partially or entirely), and a processing system 110 separate from the camera system 102 and in communication with the camera system 102 (e.g., via wired and/or wireless communication connections) may perform the functions of the processing system 106 described herein. In some embodiments, the processing system 106 and the processing system 110 may both be included in the system 100 such that the processing systems 106, 110 cooperatively perform the functions of the processing system 106 described herein. For example, in some embodiments, the processing system 106 of the camera system 102 may perform some processing (e.g., less computationally- and/or data-intensive processing), whereas the processing system 110 (e.g., a server-based and/or cloud-based processing system) may perform other processing (e.g., more computationally- and/or data-intensive processing). Accordingly, it should be appreciated that the camera system 102 may also have communication circuitry (e.g., as described in reference to FIG. 2) to communicate with other systems and devices in the system 100 (e.g., the electronic lock 108, the processing system 110, and/or other devices/systems).

As indicated above, in some embodiments, the system 100 may include an electronic lock 108 (e.g., a "smart" lock), which may include a processor to perform local processing and may be associated with one or more sensors configured to generate sensor data based on, for example, an environment of the electronic lock 108. By way of example, sensors associated with the electronic lock 108 may detect various characteristics of the physical environment of the electronic lock 108 (internal and/or external to the electronic lock 108), electrical characteristics of the electronic lock 108, electromagnetic characteristics of the electronic lock 108 or its surroundings, and/or other suitable characteristics. Further, data from the sensors may be used by the electronic lock 108 or, more particularly, its processor to interpret the security and/or operation states of the electronic lock 108. For example, data from the sensors may be used to determine the occurrence of a door prop condition, the occurrence of a forced door condition, whether the electronic lock 108 or a component thereof is in a secure/unsecure state, and/or other conditions. In various embodiments, the sensors may include one or more door position sensors (DPS), latch bolt sensors, deadbolt sensors, inertial sensors, environment sensors, dogging status sensors, request-to-exit (REX) sensors, trim sensors, tamper sensors, and/or other sensors configured to generate corresponding sensor data. In various embodiments, additional and/or alternative sensors other than those described above may be included in and/or be otherwise associated with the electronic lock 108. For example, in some embodiments, the electronic lock 108 may include and/or be associated with proximity sensors, optical sensors, light sensors, electromagnetic sensors, hall effect sensors, audio sensors, temperature sensors, motion sensors, piezoelectric sensors, switches (e.g., reed switches, physical switches, etc.), inductive sensors, capacitive sensors, and/or other types of sensors.

Further, the electronic lock 108 is configured to control access through a passageway. For example, in some embodiments, the electronic lock 108 includes a lock mechanism configured to be positioned in a locked state in which access to the passageway is denied (e.g., assuming the door is closed and/or otherwise secured), or may be positioned in an unlocked state in which access to the passageway is permitted. In some embodiments, the lock mechanism includes a deadbolt, latch bolt, lever, and/or other mechanism adapted to move between the locked and unlocked state and otherwise perform the functions described herein. However, it should be appreciated that the lock mechanism may be embodied as any another mechanism suitable for controlling access through a passageway in other embodiments. Further, in some embodiments, the electronic lock 108 is configured to receive and process access credentials from mobile devices to determine whether to allow the corresponding user's access through the passageway.

In other embodiments, one or more of the locks or other access control device(s) captured by the camera system 102 may be embodied as "dumb" access control devices (e.g., non-electronic locks) such that the access control devices do not process sensor data and/or credential data. For example, in such embodiments, the access control devices may be embodied as "simple" access control devices having one or more lock mechanisms. In various embodiments, it should be appreciated that the access control device may be embodied as a door lock (e.g., a mortise lock, a cylindrical lock, or a tubular lock), an exit device (e.g., a push bar exit device), a door closer, and/or another access control device consistent with the performance of the techniques described herein.

It should be appreciated that each of the camera system 102, the processing system 106, the electronic lock 108, and/or the processing system 110 may be embodied as a computing device/system similar to the computing system 200 described below in reference to FIG. 2. For example, in the illustrative embodiment, one or more of the camera system 102, the processing system 106, the electronic lock 108, and/or the processing system 110 may include a processing device 202 and a memory 206 having stored thereon operating logic 208 for execution by the processing device 202 for operation of the corresponding device.

It should be further appreciated that, although the processing system 110 is described herein as a device and/or system outside of a cloud computing environment, in other embodiments, the processing system 110 may be embodied as or include a cloud-based device or collection of devices within a cloud computing environment. Further, in cloud-based embodiments, the processing system 110 may be embodied as a "serverless" or server-ambiguous computing solution, for example, that executes a plurality of instructions on-demand, contains logic to execute instructions only when prompted by a particular activity/trigger, and does not consume computing resources when not in use. That is, the processing system 110 may be embodied as a virtual computing environment residing "on" a computing system (e.g., a distributed network of devices) in which various virtual functions (e.g., Lamba functions, Azure functions, Google cloud functions, and/or other suitable virtual functions) may be executed corresponding with the functions of the processing system 110 described herein. For example, when an event occurs (e.g., data is transferred to the processing system 110 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of certain data is made (e.g., via an appropriate user interface to the processing system 110), the appropriate virtual function(s) may be executed to perform the actions before eliminating the instance of the virtual function(s).

Figure 2:
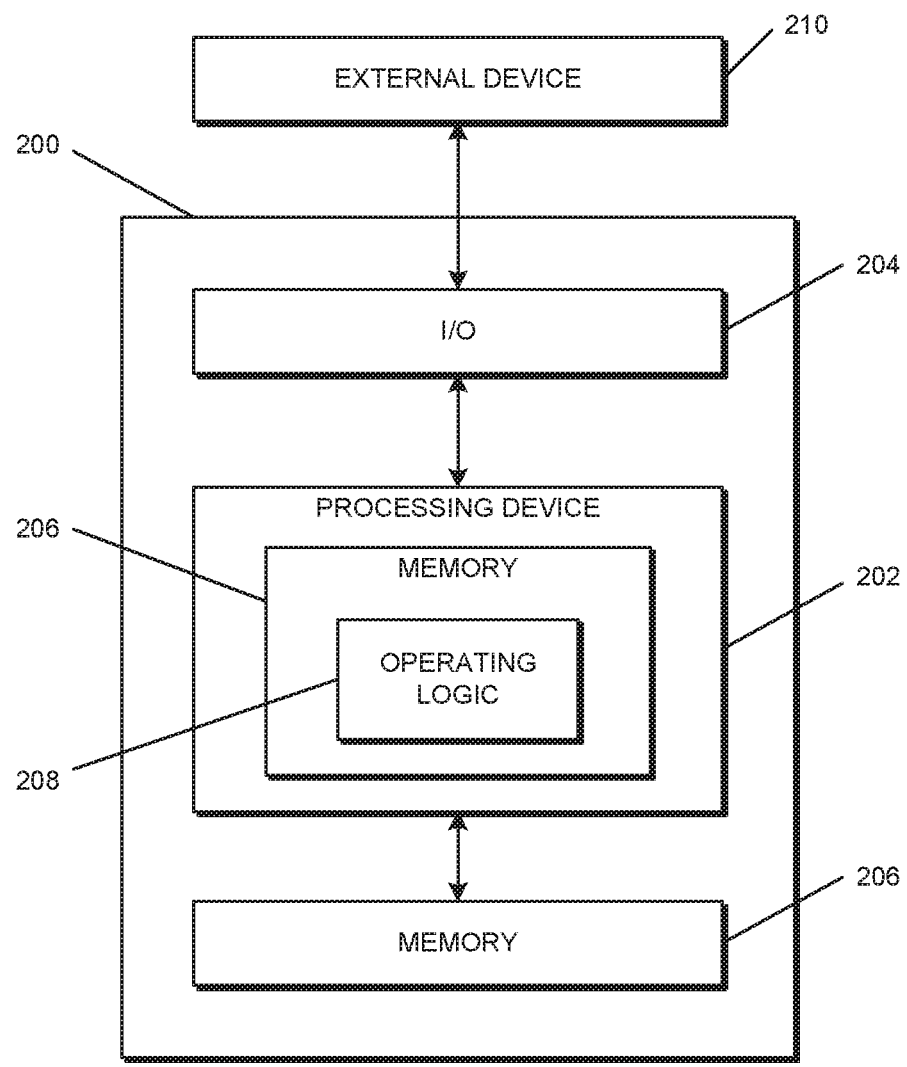
FIG. 2 is a simplified block diagram of at least one embodiment of a computing system.

Referring now to FIG. 2, a simplified block diagram of at least one embodiment of a computing system 200 is shown. The illustrative computing system 200 depicts at least one embodiment of a camera system, processing system, and/or electronic lock that may be utilized in connection with the camera system 102, the processing system 106, the electronic lock 108, and/or the processing system 110 illustrated in FIG. 1. Depending on the particular embodiment, the computing system 200 may be embodied as a camera system, processing system, electronic lock, access control device, reader device, credential device, access control device, server, desktop computer, laptop computer, tablet computer, notebook, netbook, Ultrabook™, mobile computing device, cellular phone, smartphone, wearable computing device, personal digital assistant, Internet of Things (IoT) device, control panel, router, gateway, and/or any other computing, processing, and/or communication device capable of performing the functions described herein.

The computing system 200 includes a processing device 202 that executes algorithms and/or processes data in accordance with operating logic 208, an input/output device 204 that enables communication between the computing system 200 and one or more external devices 210, and memory 206 which stores, for example, data received from the external device 210 via the input/output device 204.

The input/output device 204 allows the computing system 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing system 200. For example, in various embodiments, the external device 210 may be embodied as the camera system 102, the processing system 106, the electronic lock 108, and/or the processing system 110. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing system 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is of a programmable variety that executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable variety, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing system 200 may form a portion of a system-on-a-chip (SoC) and be incorporated on a single integrated circuit chip.

In some embodiments, various components of the computing system 200 (e.g., the processing device 202 and the memory 206) may be communicatively coupled via an input/output subsystem, which may be embodied as circuitry and/or components to facilitate input/output operations with the processing device 202, the memory 206, and other components of the computing system 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing system 200 may include other or additional components, such as those commonly found in a typical computing device (e.g., various input/output devices and/or other components), in other embodiments. It should be further appreciated that one or more of the components of the computing system 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing system 200 may include multiple processing devices 202, I/O devices 204, and/or memories 206 in other embodiments. Further, in some embodiments, more than one external device 210 may be in communication with the computing system 200.

Figure 3:
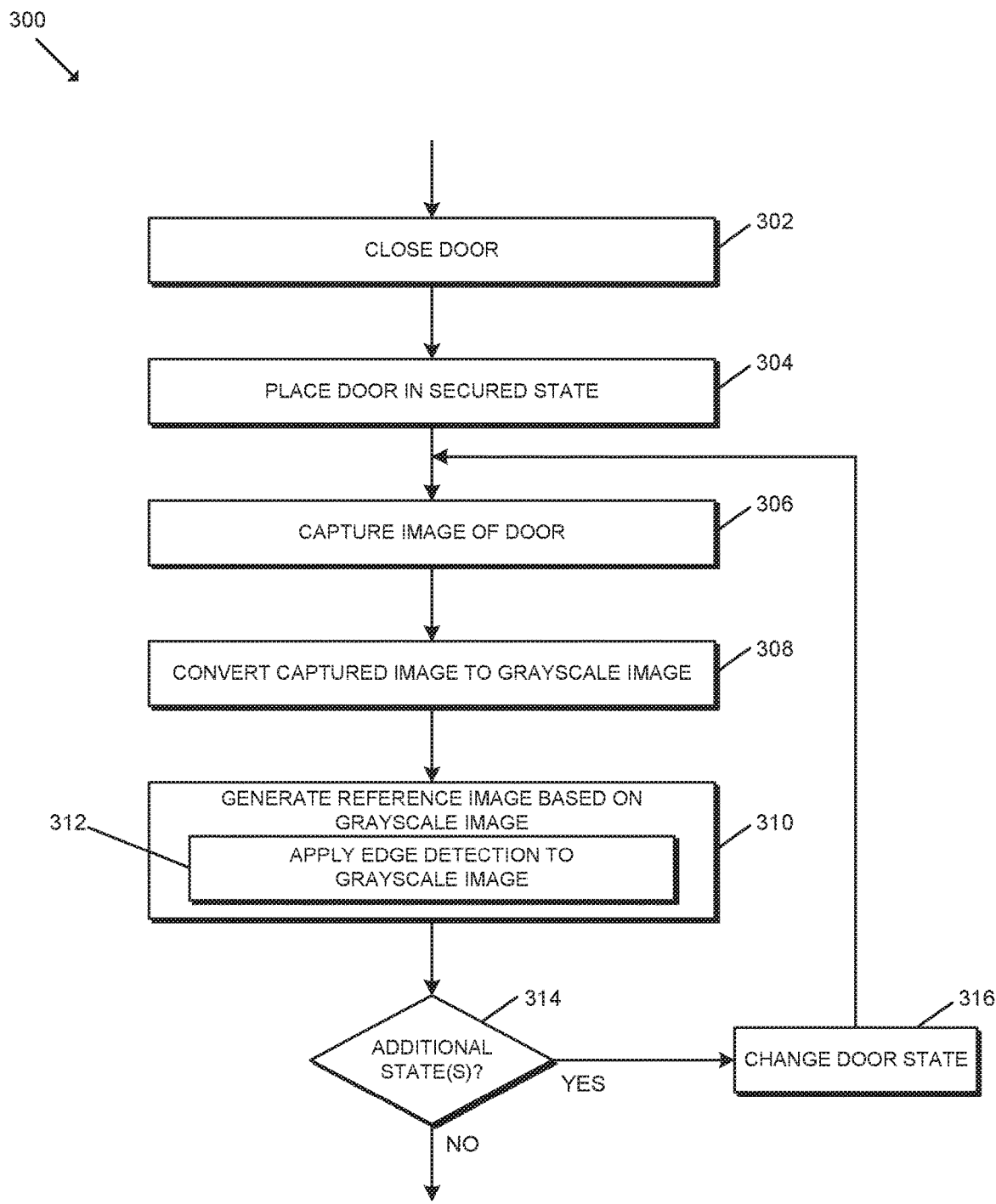
FIG. 3 is a simplified flow diagram of at least one embodiment of a method for door state registration.

Referring now to FIG. 3, in use, the system 100 (e.g., in conjunction with a user) may execute a method 300 for door state registration. It should be appreciated that the particular blocks of the method 300 are illustrated by way of example, and such blocks may be combined or divided, added or removed, and/or reordered in whole or in part depending on the particular embodiment, unless stated to the contrary. The illustrative method 300 begins with block 302 in which a door to be monitored by the camera system 102 is closed (e.g., maintained in a closed position, or moved from an open/ajar position into a fully closed position). In block 304, the door is placed in a secured state. For example, in the illustrative embodiment, each of the lock mechanisms configured to secure the door is placed in an engaged or otherwise secured state. In particular, in some embodiments, a thumbturn may be engaged in order to extend the access control device's deadbolt into a corresponding aperture of a strike plate in the door frame. Additionally or alternatively, in some embodiments, a thumbturn positioned on a door handle may be engaged in order to place a latch bolt into a secured state, for example, whereby the latch bolt is prevented from being retracted from a corresponding strike plate in the door frame.

In block 306, the camera system 102 captures (e.g., via the cameras 104) an image of the door and its environment while the door is in the secured state and, in block 308, the camera system 102 converts (e.g., via the processing system 106) the captured image to a grayscale image. In some embodiments, however, it should be appreciated that the camera system 102 may be configured to capture grayscale images in such a manner that the conversion of block 308 is omitted. It should be appreciated that, in the illustrative embodiment, the captured image of the door also captures an image of the position of the door lock, the door handle, the thumbturn(s), and/or other characteristics of the door while the door is in the secured state. For example, the camera system 102 may capture an image of the door and its environment similar to the image 600 of FIG. 6A. In other embodiments, it should be appreciated that the captured image of the door may be converted to a black/white image instead of a grayscale image. Further, in some embodiments, the captured image may be a color image and analyzed as a color image (e.g., using one or more of the channels of the color images).

Figure 6B:
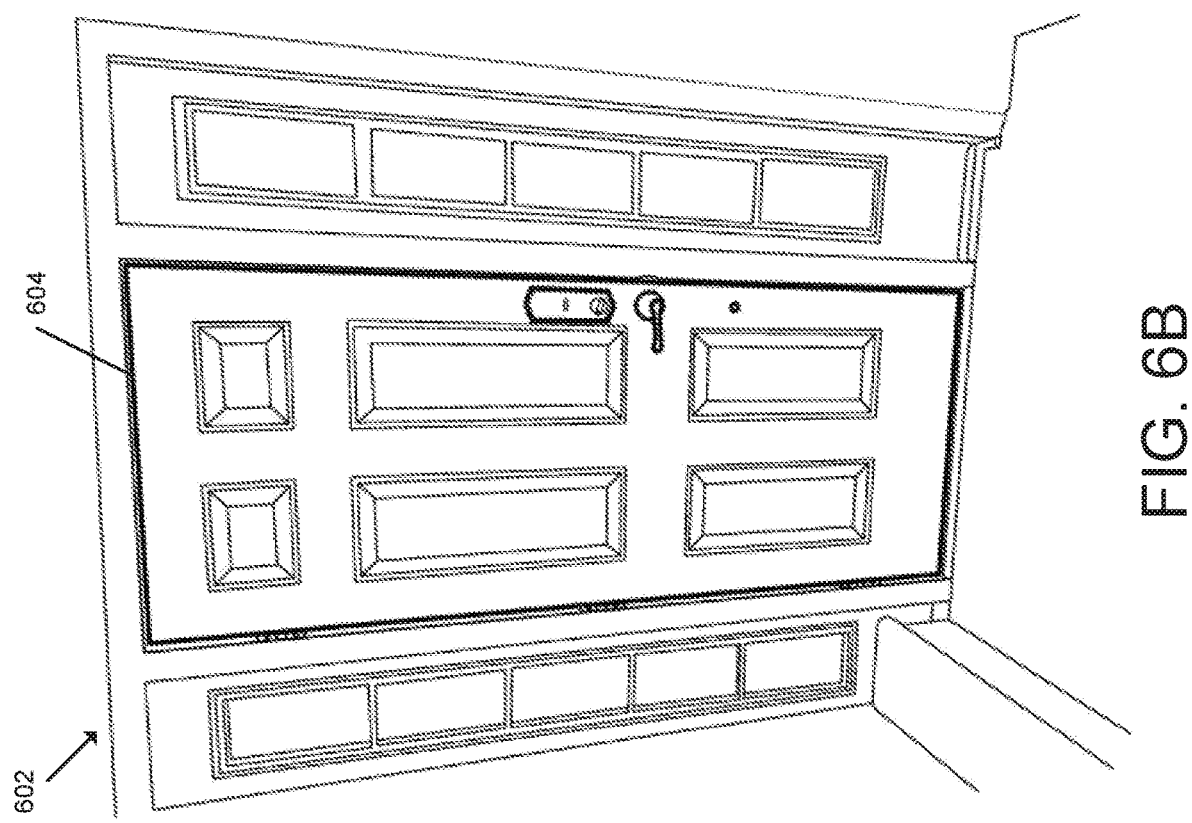
FIG. 6B illustrates a version of the image of FIG. 6A processed to identify certain edges of the door and lock mechanisms.

In block 310, the camera system 102 (e.g., via the processing system 106) generates a reference image based on the grayscale image that is indicative of the door in the secured state. In particular, in block 312, the camera system 102 may apply edge detection (e.g., Canny edge detection, Sobel filters, etc.) to the grayscale image to generate the reference image. For example, the reference image may be similar to the image 602 of FIG. 6B, which illustrates various edges 604 detected by virtue of the application of the edge detection algorithm. It should be appreciated that the particular edges 604 of FIG. 6B are emphasized by way of example, and the full extent of the identified edges 604 may not be so limited in other embodiments. In other words, the edge detection algorithm may result in a greater number or fewer number of edges being detected, for example, depending on the particular edge detection algorithm and the parameters thereof. In some embodiments, the reference image may be embodied as an image mask.

In some embodiments, it should be appreciated that multiple reference states of the door may be registered, for example, to more finely distinguish the real-time state of the door and/or its lock mechanisms. As such, if it is determined in block 314 that additional states are to be registered, the method 300 advances to block 316 in which the door state is changed. For example, the position of the door may be changed and/or the state of one or more lock mechanisms (e.g., the thumbturn(s)) of the door may be modified. After the door state is changed, the method 300 returns to block 306 in which the camera system 102 captures an image of the door and its environment in the new state, and the method 300 proceeds to generate a corresponding reference image of the door in the new state as described above.

Although the techniques described herein are in reference to edge detection, it should be appreciated that, in other embodiments, the camera system 102 may utilize suitable techniques to generate a reference image and/or calculate reference data of the door and/or its environment using one or more image segmentation algorithms, blob detection algorithms, corner detection algorithms, features identification and/or matching algorithms, morphological image processing algorithms, and/or other suitable image processing algorithms.

Although the blocks 302-316 are described in a relatively serial manner, it should be appreciated that various blocks of the method 300 may be performed in parallel in some embodiments.

Figure 4:
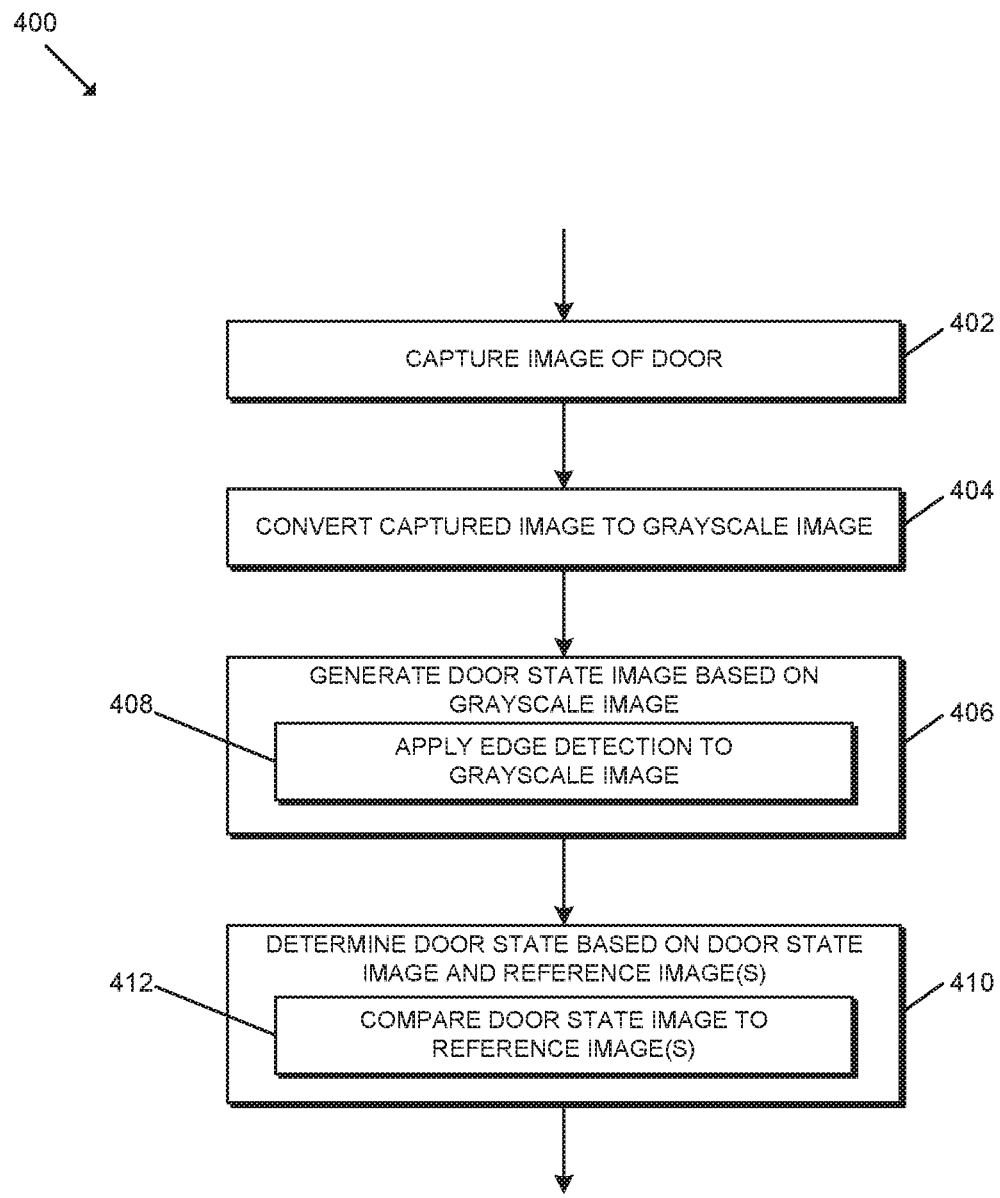
FIG. 4 is a simplified flow diagram of at least one embodiment of a method for camera-based door position detection.

Referring now to FIG. 4, in use, the system 100 may execute a method 400 for camera-based door position detection. It should be appreciated that the particular blocks of the method 400 are illustrated by way of example, and such blocks may be combined or divided, added or removed, and/or reordered in whole or in part depending on the particular embodiment, unless stated to the contrary. The illustrative method 400 begins with block 402 in which the camera system 102 captures (e.g., via the cameras 104) an image of the door and its environment in its current state. It should be appreciated that, in the illustrative embodiment, the captured image of the door also captures an image of the position of the door lock, the door handle, the thumbturn(s), and/or other characteristics of the door while the door is in the secured state.

Figure 6A:
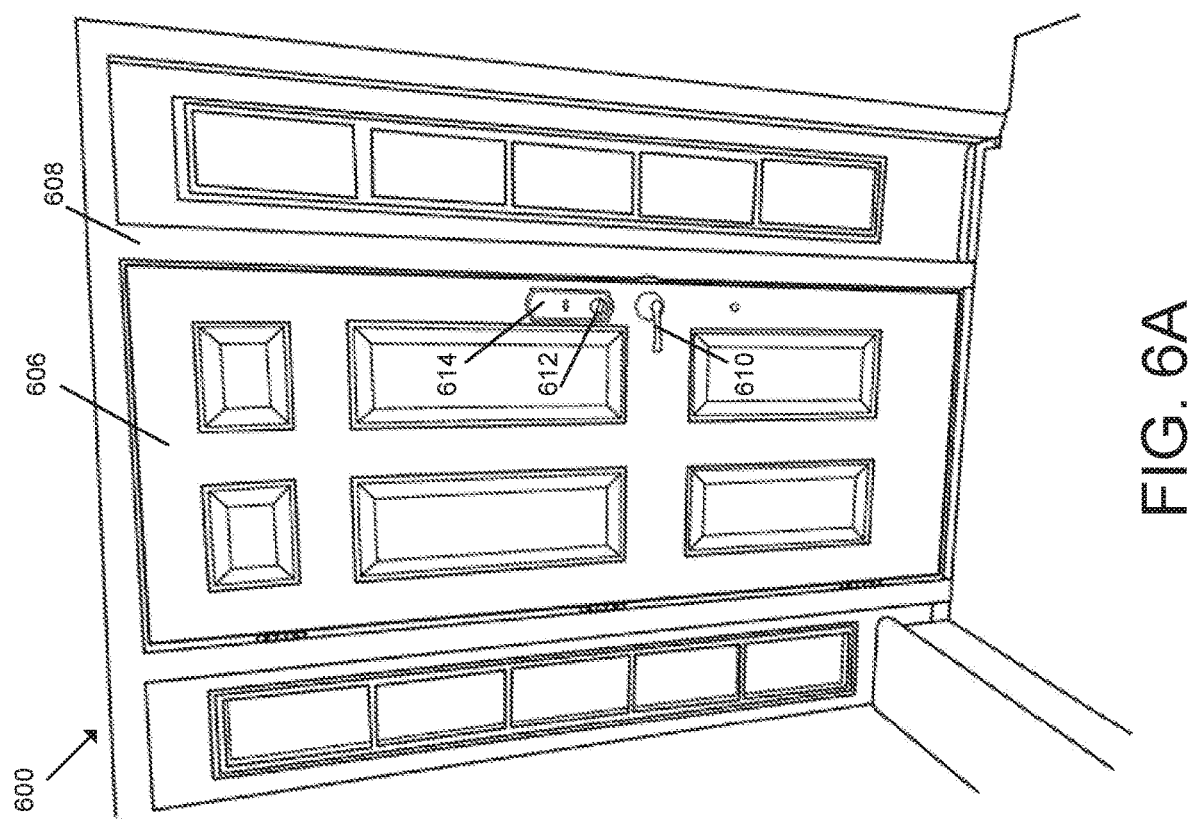
FIG. 6A illustrates an image of a door captured by a camera system when the door is in a closed and secured state.

For example, if the door is in a closed and secured state, the image may be similar to the image 600 of FIG. 6A in which the door 606 is in a closed position relative to the door frame 608. Further, as shown, the door 606 of FIG. 6A includes a door handle 610 and a thumbturn 612 illustrated in a position in which a deadbolt 616 of a door lock 614 is engaged/extended to secure the door. In some embodiments, such conditions may correlate with a "fully secure" security state of the door.

Figure 7A:
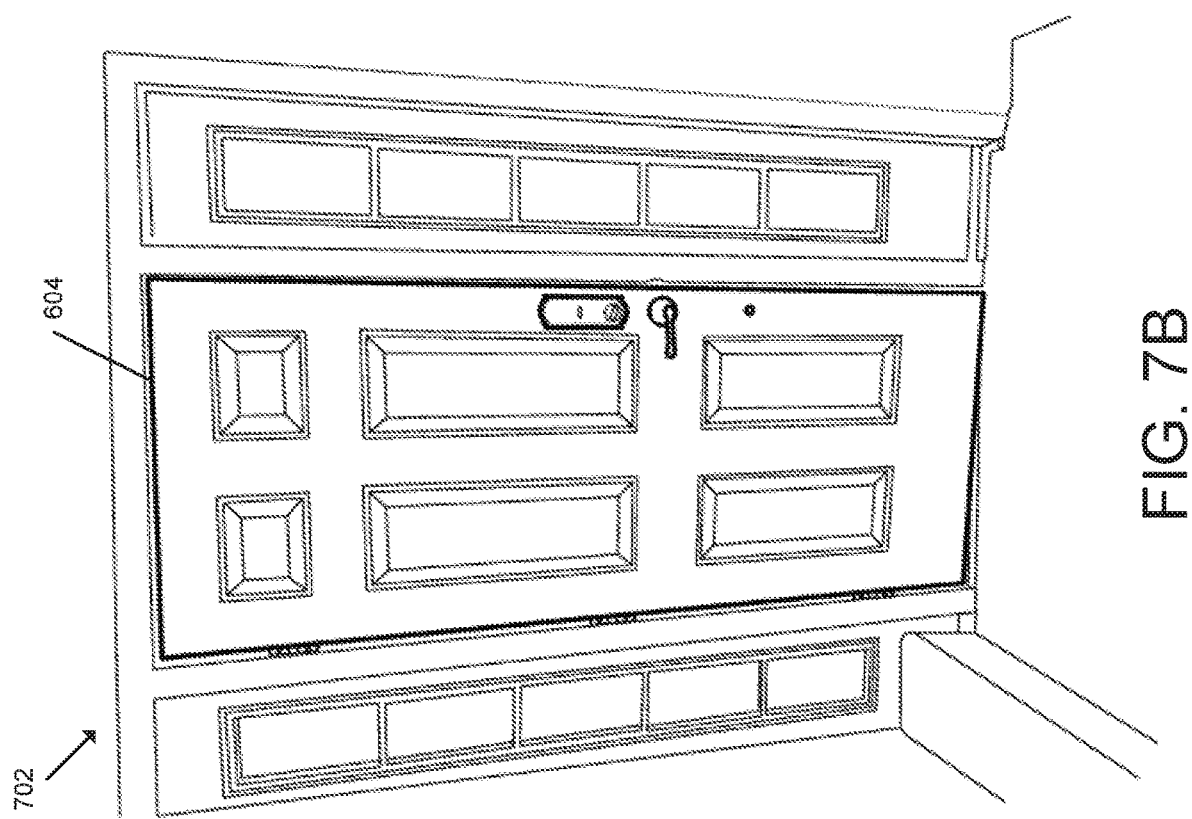
FIG. 7A illustrates an image of the door captured by the camera system when the door is slightly ajar.

However, if the door is in an ajar or slightly open position, the image may be similar to the image 700 of FIG. A in which the door 606 is in an open position relative to the door frame 608. Further, the image 700 of FIG. 7A illustrates the thumbturn 612 in a position in which the deadbolt 616 of the door lock 614 is also engaged/extended. In other words, the image 700 illustrates that the door 606 is slightly opened with the deadbolt 616 extended. For example, the deadbolt 616 may be extended in order to prop the door 606. In some embodiments, such conditions may correlate with an "opened" or intermediate security state of the door. Although the illustrative thumbturn 612 is in the engaged position when the thumbturn 612 is relatively horizontal and in the disengaged position when the thumbturn 612 is relatively vertical by convention, it should be appreciated that, in other embodiments and without loss of generality, the thumbturn 612 may be in the engaged position when the thumbturn 612 is relatively vertical and in the disengaged position when the thumbturn 612 is relatively horizontal. Further, in other embodiments, different positions may correspond with engaged and/or disengaged positions.

Figure 8A:
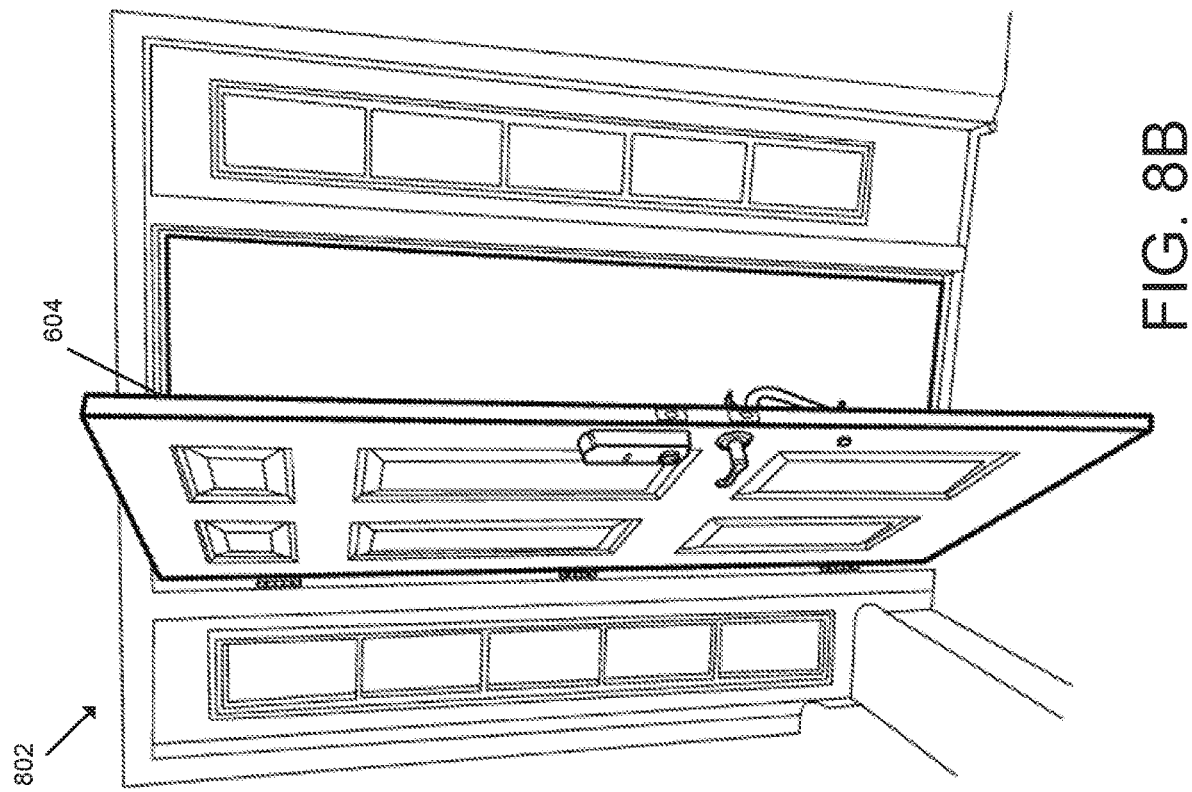
FIG. 8A illustrates an image of the door captured by the camera system when the door is in an opened position.

If the door is in a generally open position, the image may be similar to the image 800 of FIG. 8A in which the door 606 is in an opened position relative to the door frame 608. Further, the image 800 of FIG. 8A depicts the thumbturn 612 in a position in which the deadbolt 616 of the door lock 614 is disengaged/retracted. In some embodiments, such conditions may correlate with a "fully open" security state of the door.

Returning to FIG. 4, in block 404, the camera system 102 converts (e.g., via the processing system 106) the captured image to a grayscale image. As described in reference to the method 300 of FIG. 3, in some embodiments, it should be appreciated that the camera system 102 may be configured to capture grayscale images in such a manner that the conversion of block 404 is omitted. In other embodiments, it should be appreciated that the captured image of the door may be converted to a black/white image instead of a grayscale image.

Figure 7B:
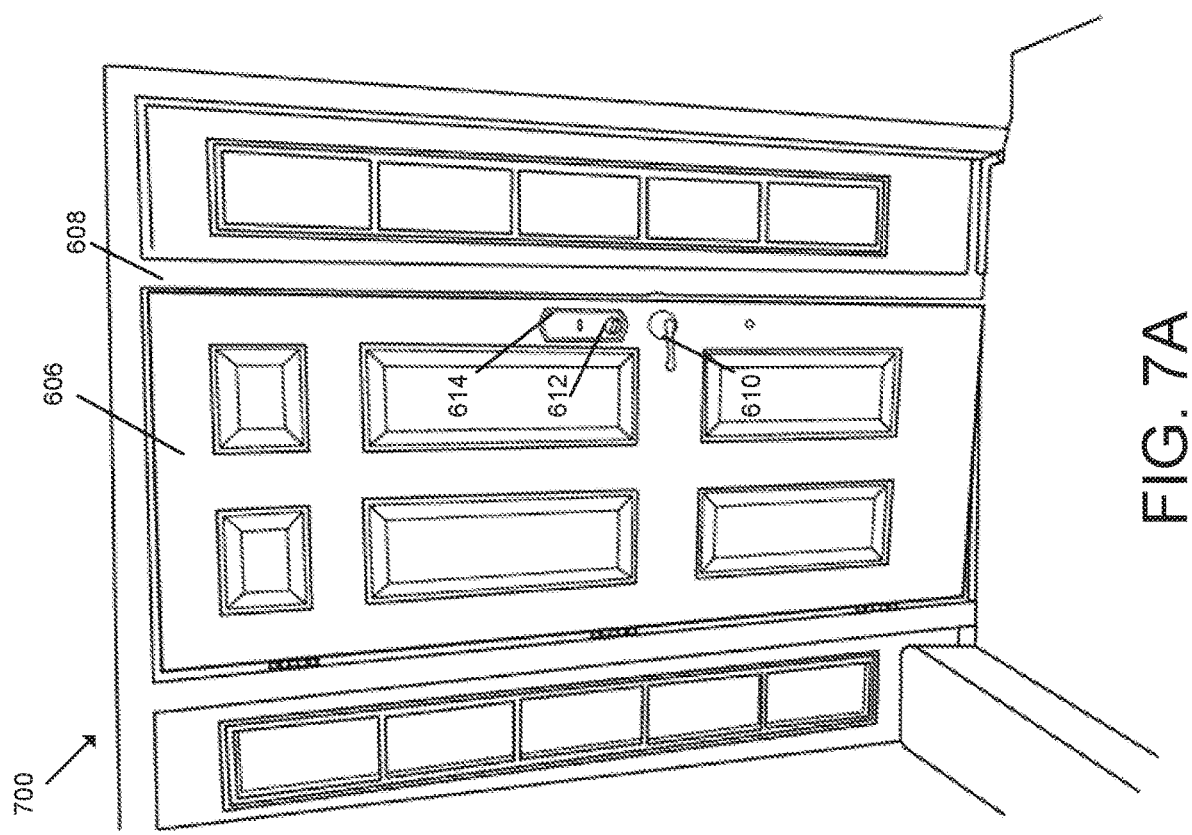
FIG. 7B illustrates a version of the image of FIG. 7A processed to identify certain edges of the door and lock mechanisms.
Figure 8B:
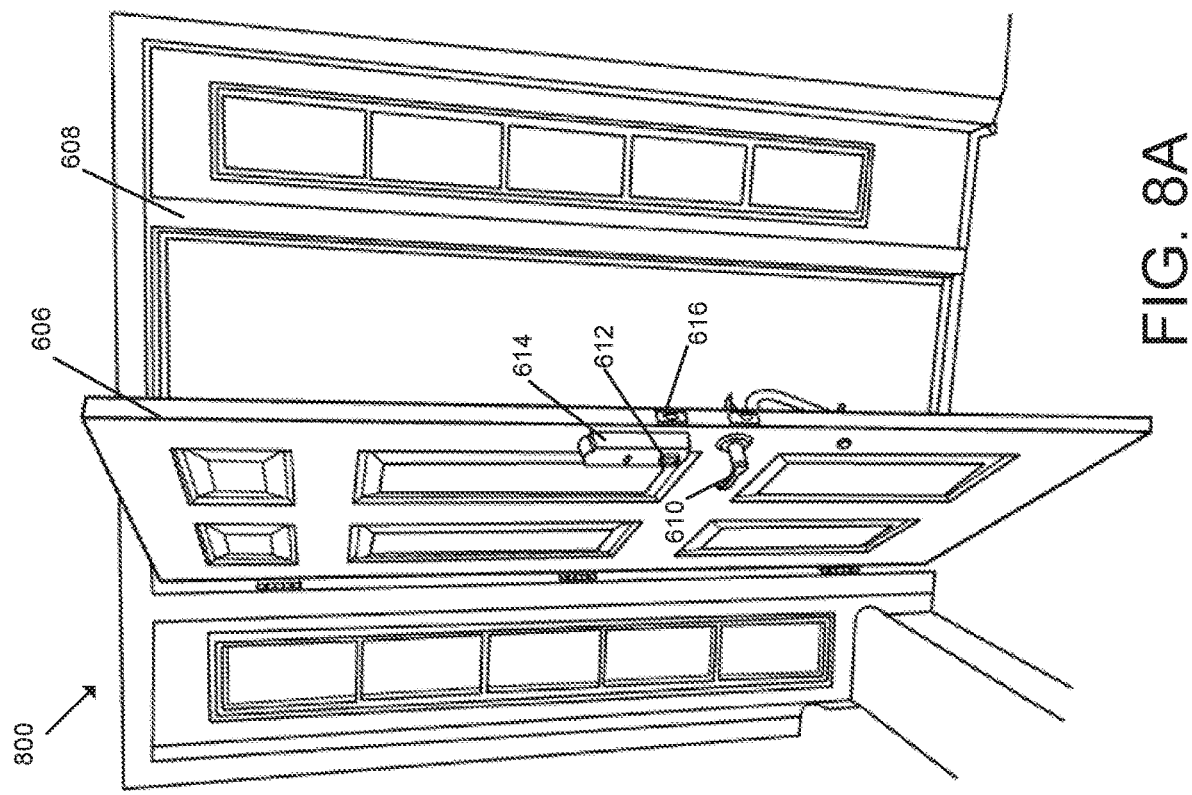
FIG. 8B illustrates a version of the image of FIG. 8A processed to identify certain edges of the door and lock mechanisms.

In block 406, the camera system 102 (e.g., via the processing system 106) generates a door state image based on the grayscale image that is indicative of the door in the current state. In particular, in block 408, the camera system 102 may apply edge detection (e.g., Canny edge detection, Sobel filters, etc.) to the grayscale image to generate the reference image. For example, it should be appreciated that the reference image may be similar to the image 602 of FIG. 6B if the captured image was similar to the image 600 of FIG. 6A, the reference image may be similar to the image 702 of FIG. 7B if the captured image was similar to the image 700 of FIG. 7A, and the reference image may be similar to the image 802 of FIG. 8B if the captured image was similar to the image 800 of FIG. 8A. It should be appreciated that the particular edges 604 of FIGS. 6B, 7B, and 8B are emphasized by way of example, and the full extent of the identified edges 604 may not be so limited in other embodiments. In other words, the edge detection algorithm may result in a greater number or fewer number of edges being detected, for example, depending on the particular edge detection algorithm and the parameters thereof.

In block 410, the camera system 102 (e.g., via the processing system 106) determines a current state of the door based on the door state image and the one or more reference images generated via the method 300 of FIG. 3. For example, in block 412, the camera system 102 may compare the door state image to the reference image(s). In the illustrative embodiment, the cameras 104 are relatively static in position. Accordingly, if the door is in a particular reference state, the current door state image should be approximately the same image as the corresponding reference image. It should be appreciated that the camera system 102 may utilize any suitable techniques and/or algorithms to compare the current door state image to the reference image(s). For example, as described in reference to FIG. 5, in some embodiments, the reference image may be embodied as a mask image that is applied to the current door state image to generate a difference image, which may be analyzed to determine whether the current door state corresponding to that reference state. However, in other embodiments, it should be appreciated that other techniques for comparing the current door state image to the reference image(s) may be employed. For example, in some embodiments, the camera system 102 may analyze and compare the locations and/or angles of various edges between the reference image(s) and the current door state image. It should be further appreciated that, in some embodiments, the camera system 102 may "know" the approximate location of specific features of the door environment (e.g., due to a static camera positioning) and analyze only those image regions. In some embodiments, it should be appreciated that only a single reference image is utilized depicting the door in a closed and locked security state. Accordingly, in such embodiments, if the current door state image deviates from that single reference image by at least a threshold amount, the door may be determined to be in an opened and/or unsecure state.

As indicated above, although the techniques described herein are in reference to edge detection, it should be appreciated that, in other embodiments, the camera system 102 may utilize suitable techniques to generate a current door state image and/or calculate data of the door and/or its current environment using one or more image segmentation algorithms, blob detection algorithms, corner detection algorithms, features identification and/or matching algorithms, morphological image processing algorithms, and/or other suitable image processing algorithms, which may be compared to corresponding reference data associated with one or more reference door states.

Although the blocks 402-412 are described in a relatively serial manner, it should be appreciated that various blocks of the method 400 may be performed in parallel in some embodiments.

Figure 5:
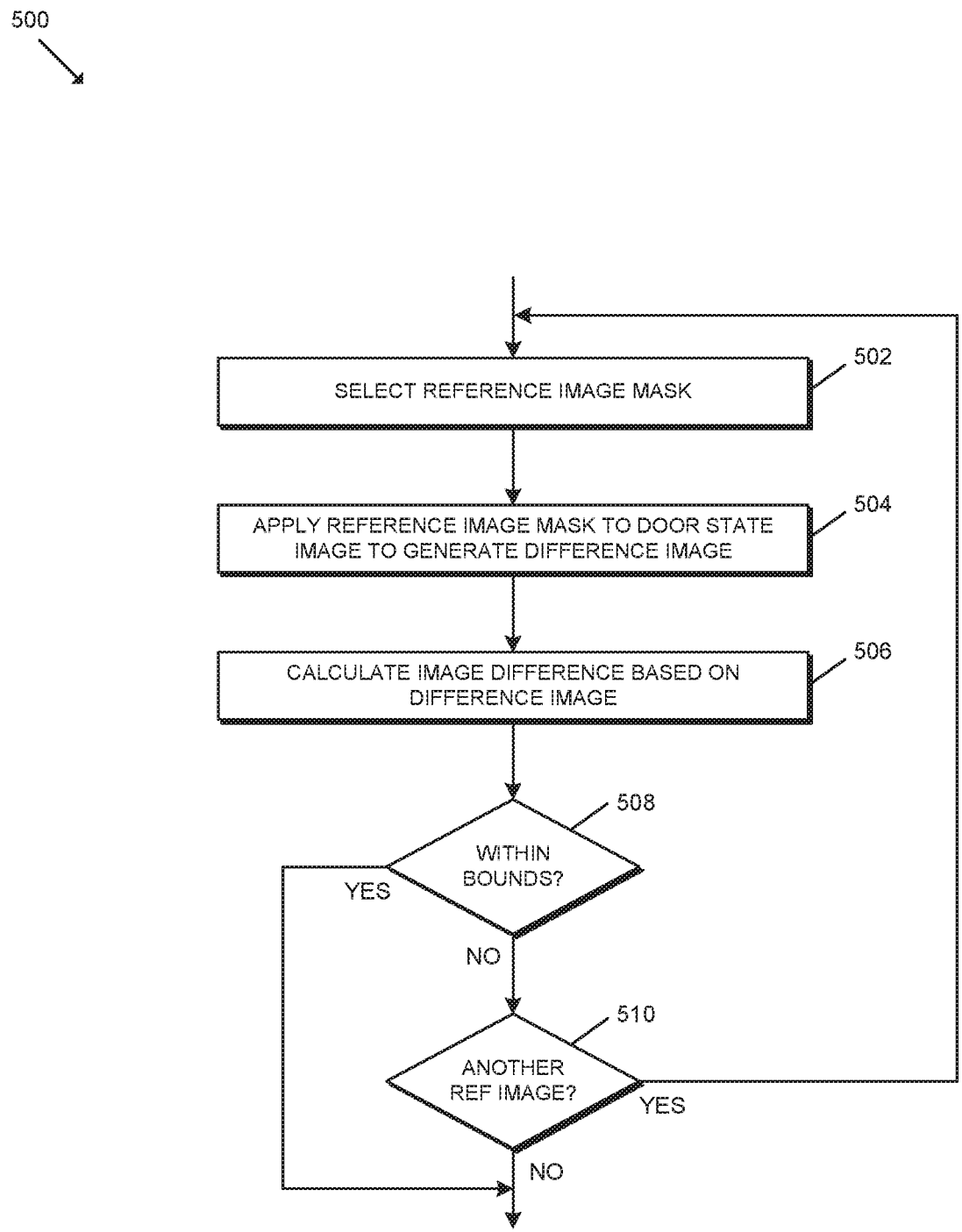
FIG. 5 is a simplified flow diagram of at least one embodiment of a method for determining a current door state.

Referring now to FIG. 5, in use, the system 100 may execute a method 500 for determining a current door state. For example, in some embodiments, the method 500 may be executed as part of block 410 of FIG. 4. It should be appreciated that the particular blocks of the method 500 are illustrated by way of example, and such blocks may be combined or divided, added or removed, and/or reordered in whole or in part depending on the particular embodiment, unless stated to the contrary. The illustrative method 500 begins with block 502 in which the camera system 102 (e.g., via the processing system 106) selects a reference image mask for comparison to the door state image and, in block 504, the camera system 102 (e.g., via the processing system 106) applies the selected reference mask image to the door state image to generate a different image. For example, in some embodiments, the selected reference mask image may be applied as a filter to the door state image.

In block 506, the camera system 102 (e.g., via the processing system 106) calculates an image difference based on the difference image. For example, in some embodiments, the camera system 102 may employ an algorithm that generates one or more numerical values indicative of the difference between the images based on the difference image. Specifically, in some embodiments, the pixel values in the difference image may be summed or otherwise aggregated to generate a single image difference value. However, it should be appreciated that the image difference may be otherwise calculated in other embodiments.

In block 508, the camera system 102 (e.g., via the processing system 106) determines whether the image difference is within threshold bounds (e.g., having an image difference no greater than a predetermined threshold value). If so, the camera system 102 may determine the current door state to be associated with the door state corresponding to the reference image mask. It should be appreciated that the threshold bounds may vary depending on the particular embodiment and may vary depending on the particular reference image. If the camera system 102 determines, in block 508, that the image difference does not fall within the threshold bounds, the camera system 102 may determine that the current door state is not associated with the door state corresponding to the reference image mask. Accordingly, in block 510, the camera system 102 may determine whether another reference image mask should be selected for comparison. If so, the method 500 returns to block 502 in which the camera system 102 selects another reference image mask and performs the functions described above in reference to the newly selected reference image mask. However, if the camera system 102 determines, in block 510, that no reference image masks remain for comparison, the camera system 102 determines that the current door state is associated with an opposite or default door state. For example, if the reference images include an image indicative of a closed and secured door state, the default door state may be the opened and/or unsecured door state.

Although the blocks 502-510 are described in a relatively serial manner, it should be appreciated that various blocks of the method 500 may be performed in parallel in some embodiments.

It should be further appreciated that the techniques described herein may be employed to ascertain various other conditions associated with the door and/or the door environment. For example, in some embodiments, multiple images may be analyzed in sequence to determine whether someone has entered or exited through a particular door. In particular, with a series of images on a timeline, the camera system 102 may identify the image frame at which the door begins to open such that if a "blob" is detected in front of the door at that time, it may be indicative of a person opening the door from the camera side of the door (e.g., the interior side and exiting). By contrast, if no blob is detected at that time, it may be indicative of a person opening the door from the side of the door opposite the camera side (e.g., the exterior side and entering). Further, in some embodiments, the techniques described herein may be used to determine various other door conditions (e.g., door prop, tailgating, etc.).

Additionally, although the techniques are described herein primarily in reference to a statically positioned camera 104, in other embodiments, the techniques described herein may be similarly employed in situations in which the position of the camera 104 is dynamic but the surrounding environment is relatively static. For example, in some embodiments, a door-mounted camera (e.g., a peephole camera) may be used to capture images of the environment of the door when the door is in a closed and secured state, which may be subsequently compared to images captured by the door-mounted camera when the door is moved from the closed position into an opened position.

As indicated above, in some embodiments, the system 100 may include an electronic lock 108. In such embodiments, it should be appreciated that the camera system 102 may transmit a result of its analysis, which may be used in conjunction with the data generated by the electronic lock 108 to form a more thorough understanding of the current state of the door, its locking systems, and/or other door mechanisms. Additionally or alternatively, the data transmitted by the camera system 102 may be used by the electronic lock 108 to ensure that there are no false positives or false negatives in the analysis of the electronic lock 108 (e.g., ensuring that the deadbolt is only thrown when the door is in the closed position).

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

According to an embodiment, a method of determining a door state in a camera-based door position system includes capturing, by a camera system, an image of a door lock secured to a door, wherein the door lock includes a thumb-turn that is moveable between a first position corresponding to a locked state and a second position corresponding to an unlocked state, converting, by a processing system, the captured image to a grayscale image, generating, by the processing system, a door state image based on the grayscale image, and determining, by the processing system, a current door state of the door based on the door state image and a reference image. In some embodiments, determining the current door state may include determining whether the door is in one of a closed position or an opened position. In some embodiments, determining the current door state may include determining whether the thumbturn is in the first position or the second position. In some embodiments, the reference image may correspond to the door being in a closed position and the thumbturn being in the first position corresponding to the locked state. In some embodiments, generating the door state image may include applying edge detection to the grayscale image. In some embodiments, determining the current door state may include comparing the door state image to the reference image. In some embodiments, the reference image may include a reference image mask. In some embodiments, generating the door state image may include applying the reference image mask to the grayscale image, and determining the current door state may include calculating an image difference based on the difference image. In some embodiments, determining the current door state may include determining the door to be in a state corresponding to the reference image in response to a determination that the image difference is within threshold bounds. In some embodiments, the camera system may include the processing system.

According to another embodiment, a camera-based door position system includes a camera configured to capture an image of a door lock secured to a door, wherein the door lock includes a thumbturn that is moveable between a first position corresponding to a locked state and a second position corresponding to an unlocked state, and a processing system including a processor and a memory having a plurality of instructions stored thereon that, in response to execution by the processor, causes the processing system to convert the captured image to a grayscale image, generate a door state image based on the grayscale image, and determine a current door state of the door based on the door state image and a reference image. In some embodiments, to determine the current door state may include to determine whether the door is in one of a closed position or an opened position. In some embodiments, to determine the current door state may include to determine whether the thumbturn is in the first position or the second position. In some embodiments, the reference image may correspond with the door being in a closed position and the thumbturn being in the first position corresponding to the locked state. In some embodiments, to generate the door state image may include to apply edge detection to the grayscale image. In some embodiments, to determine the current door state may include to compare the door state image to the reference image. In some embodiments, the reference image may include a reference image mask, to generate the door state image may include to apply the reference image mask to the grayscale image, and to determine the current door state may include to calculate an image difference based on the difference image and determine the door to be in a state corresponding to the reference image in response to a determination that the image difference is within threshold bounds.

According to yet another embodiments, a processing system includes a processor and a memory having a plurality of instructions stored thereon that, in response to execution by the processor, causes the processing system to receive a captured image of a door lock secured to a door, wherein the door lock includes a thumbturn that is moveable between a first position corresponding to a locked state and a second position corresponding to an unlocked state, convert the captured image to a grayscale image, generate a door state image based on the grayscale image, and determine a current door state of the door based on the door state image and a reference image. In some embodiments, to determine the current door state may include to determine whether the door is in one of a closed position or an opened position. In some embodiments, to determine the current door state may include to determine whether the thumbturn is in the first position or the second position.

What is claimed is:

1. A method of determining a door state in a camera-based door position system, the method comprising:
    capturing, by a camera system, an image of a door lock secured to a door, wherein the door lock includes a thumbturn that is moveable between a first position corresponding to a locked state and a second position corresponding to an unlocked state;
    converting, by a processing system, the captured image to a grayscale image;
    generating, by the processing system, a door state image based on the grayscale image; and
    determining, by the processing system, a current door state of the door based on the door state image and a reference image, wherein determining the current door state comprises determining whether the door is in one of the closed position or the opened position and whether the thumbturn is in the first position or the second position, and wherein the reference image corresponds to the door being in the closed position and the thumbturn being in the first position corresponding to the locked state.

2. The method of claim 1, wherein generating the door state image comprises applying edge detection to the grayscale image.

3. The method of claim 1, wherein determining the current door state comprises comparing the door state image to the reference image.

4. The method of claim 1, wherein the reference image comprises a reference image mask.

5. The method of claim 4, wherein generating the door state image comprises applying the reference image mask to the grayscale image; and
    wherein determining the current door state comprises calculating an image difference based on the difference image.

6. The method of claim 5, wherein determining the current door state comprises determining the door to be in a state corresponding to the reference image in response to a determination that the image difference is within threshold bounds.

7. The method of claim 1, wherein the camera system comprises the processing system.

8. A camera-based door position system, comprising:
    a camera configured to capture an image of a door lock secured to a door, wherein the door lock includes a thumbturn that is moveable between a first position corresponding to a locked state and a second position corresponding to an unlocked state; and
    a processing system including a processor and a memory having a plurality of instructions stored thereon that, in response to execution by the processor, causes the processing system to (i) convert the captured image to a grayscale image, (ii) generate a door state image based on the grayscale image, and (iii) determine a current door state of the door based on the door state image and a reference image, wherein to determine the current door state comprises to determine whether the door is in one of the closed position or the opened position and whether the door is in one of the closed position or the opened position, and wherein the reference image corresponds to the door being in the closed position and the thumbturn being in the first position corresponding to the locked state.

9. The camera-based door position system of claim 8, wherein to generate the door state image comprises to apply edge detection to the grayscale image.

10. The camera-based door position system of claim 8, wherein to determine the current door state comprises to compare the door state image to the reference image.

11. The camera-based door position system of claim 8, wherein the reference image comprises a reference image mask;
    wherein to generate the door state image comprises to apply the reference image mask to the grayscale image; and wherein to determine the current door state comprises to (i) calculate an image difference based on the difference image and (ii) determine the door to be in a state corresponding to the reference image in response to a determination that the image difference is within threshold bounds.

12. A processing system, comprising:

a processor; and a memory having a plurality of instructions stored thereon that, in response to execution by the processor, causes the processing system to:

receive a captured image of a door lock secured to a door, wherein the door lock includes a thumbturn that is moveable between a first position corresponding to a locked state and a second position corresponding to an unlocked state;

convert the captured image to a grayscale image;

generate a door state image based on the grayscale image; and determine a current door state of the door based on the door state image and a reference image, wherein to determine the current door state comprises to determine whether the door is in one of the closed position or the opened position and whether the thumbturn is in the first position or the second position, and wherein the reference image corresponds to the door being in the closed position and the thumbturn being in the first position corresponding to the locked state.

* * * * *